United States Patent
Liu et al.

(10) Patent No.: US 10,983,645 B2
(45) Date of Patent: Apr. 20, 2021

(54) TOUCH MODULE AND METHOD FOR MANUFACTURING THE SAME

(71) Applicant: TPK ADVANCED SOLUTIONS INC., Xiamen (CN)

(72) Inventors: Qi-Bin Liu, Fujian (CN); You-Zhi She, Fujian (CN); Kuo-Lung Fang, Hsinchu County (TW); Jun-Rong Chen, Hsinchu County (TW); Shih-Hao Chen, Hsinchu County (TW); Jun-Ping Yang, Fujian (CN); Xiao-Xia You, Fujian (CN); Qi-Jun Zheng, Fujian (CN); Jun-Jie Zheng, Fujian (CN)

(73) Assignee: TPK ADVANCED SOLUTIONS INC., Xiamen (CN)

( * ) Notice: Subject to any disclaimer, the term of this patent is extended or adjusted under 35 U.S.C. 154(b) by 0 days.

(21) Appl. No.: 16/541,191

(22) Filed: Aug. 15, 2019

(65) Prior Publication Data

US 2020/0057528 A1 Feb. 20, 2020

(30) Foreign Application Priority Data

Aug. 15, 2018 (CN) .......................... 201810927813.3

(51) Int. Cl.
*G06F 3/044* (2006.01)
*G06F 3/041* (2006.01)

(52) U.S. Cl.
CPC .......... *G06F 3/0444* (2019.05); *G06F 3/0414* (2013.01); *G06F 2203/04103* (2013.01)

(58) Field of Classification Search
CPC ......... G06F 2203/04103; G06F 3/0444; G06F 3/0414; G06F 3/0443; G06F 3/041; G06F 3/044; G06F 3/0412; H05K 3/28; H05K 2201/0191; H05K 2201/09972; H05K 3/323; H05K 3/36; H05K 1/11; H05K 1/141; H05K 3/368; H05K 2201/049; H05K 2203/1377; H05K 2203/0278; H05K 3/305; H05K 3/321; H05K 3/386

See application file for complete search history.

(56) References Cited

U.S. PATENT DOCUMENTS

| | | | |
|---|---|---|---|
| 2016/0062512 A1* | 3/2016 | Ishizaki ................ | G06F 3/0412 345/174 |
| 2016/0255716 A1* | 9/2016 | Eifuku .................... | H05K 3/323 174/254 |
| 2019/0239359 A1* | 8/2019 | Wang ..................... | H05K 3/323 |

* cited by examiner

*Primary Examiner* — Temesghen Ghebretinsae
*Assistant Examiner* — Karin Kiyabu
(74) *Attorney, Agent, or Firm* — Idea Intellectual Limited; Margaret A. Burke; Sam T. Yip

(57) ABSTRACT

A touch module includes a touch panel unit, a conductive adhesive layer and a circuit board. The touch panel unit includes a substrate, a touch sensing structure disposed on the substrate, a signal transmitting structure disposed on the substrate and electrically connected to the touch sensing structure, and a protection layer covering a part of a surface of the signal transmitting structure. The protection layer and the substrate are disposed at two opposite sides of the signal transmitting structure. The conductive adhesive layer has a main portion which covers a region of the signal transmitting structure on which the protection layer is not disposed, and a cover portion which extends from the main portion and covers the protection layer. The circuit board is disposed on the conductive adhesive layer, and the circuit board and the signal transmitting structure are disposed at two opposite sides of the conductive adhesive layer.

10 Claims, 5 Drawing Sheets

TOUCH MODULE AND METHOD FOR MANUFACTURING THE SAME

FIELD

This disclosure is related to a touch module and a method for manufacturing the same.

BACKGROUND

Touch screen interfaces are intuitive and convenient. As such, many commercial electronic devices have an integrated touch module as a user interface. A conventional touch module is a touch sensing structure made of a transparent conductive film or other materials and is used to detect a touched position or positions. In the touch sensing structure, a response signal produced based on gestures of a user is transmitted to a bond pad by, e.g., a metal wire, and is then transmitted to a control chip through a circuit board, which is electrically connected to the bond pad, to conduct related analysis and control.

The bond pad of the touch module and an electrically conductive contact (golden finger) of the circuit board are electrically connected to each other through a conductive medium, e.g., a conductive adhesive. The conductive medium is distributed on the bond pad but usually does not cover an entire surface of the bond pad. Thus, an exposed region of the bond pad is likely to be affected by harmful factors in the environment, thereby resulting in abnormal electrical properties and appearance which affect touch performance and product yield rate. The aforesaid problems of abnormal electrical properties and appearance have be traditionally been mitigated by applying a glue at a region of the bond pad that is not covered with the conductive medium through a dispensing process to provide comprehensive protection to the bond pad.

SUMMARY

In some embodiments, a touch module includes a touch panel unit, a conductive adhesive layer and a circuit board. The touch panel unit includes a substrate, a touch sensing structure disposed on the substrate, a signal transmitting structure disposed on the substrate and electrically connected to the touch sensing structure, and a protection layer covering a part of a surface of the signal transmitting structure. The protection layer and the substrate are disposed at two opposite sides of the signal transmitting structure. The conductive adhesive layer includes a main portion which covers a region of the signal transmitting structure that is exposed from the protection layer and a cover portion which extends from the main portion to cover the protection layer. The circuit board is disposed on the conductive adhesive layer, and the circuit board and the signal transmitting structure are disposed at two opposite sides of the conductive adhesive layer. The circuit board includes a plate and an electrically conductive structure formed on the plate and electrically connected to the conductive adhesive layer.

In some embodiments, the circuit board and the protection layer do not overlap.

In some embodiments, a distance between an edge of the plate which is adjacent to the protection layer and an edge of the protection layer ranges from 100 µm to 400 µm.

In some embodiments, the electrically conductive structure of the circuit board and the protection layer do not overlap. An edge of the plate overlaps the cover portion of the conductive adhesive layer, and the edge and the protection layer are disposed at two opposite sides of the cover portion.

In some embodiments, a width of the cover portion of the conductive adhesive layer covering the protection layer ranges from 500 µm to 700 µm.

In some embodiments, an overlapping width between the edge of the plate and the protection layer ranges from 50 µm to 700 µm.

A manufacturing method includes the following steps: (A) providing a touch panel unit and a circuit board, the touch panel unit including a substrate, a touch sensing structure disposed on the substrate, a signal transmitting structure disposed on the substrate and electrically connected to the touch sensing structure, and a protection layer covering a part of a surface of the signal transmitting structure, the circuit board including a plate and an electrically conductive structure disposed on the plate; (B) disposing a conductive adhesive layer on a surface of the signal transmitting structure where the protection layer is not disposed, and spacing the conductive adhesive layer apart from the protection layer; (C) aligning the circuit board with the conductive adhesive layer such that the electrically conductive structure of the circuit board faces the conductive adhesive layer; and (D) pressing the circuit board toward the touch panel unit and the conductive adhesive layer so that the electrically conductive structure of the circuit board is electrically connected to the conductive adhesive layer. By way of the pressing of the circuit board, the conductive adhesive layer flows toward the protection layer so that the conductive adhesive layer is formed into a main portion that covers a portion of the signal transmitting structure on which the protection layer is not disposed, and a cover portion that extends from the main portion to the protection layer and covers the protection layer.

In some embodiments, in step (A), a pressing structure is further provided, the pressing structure having a contact surface abutting against the plate and a side edge connecting the contact surface, the contact surface of the pressing structure being indented at a location corresponding to the side edge to form a flowing region; in step (C), the circuit board is adjacent to the protection layer but not overlapping the protection layer; and step (D) includes the following steps: (D1) aligning the pressing structure with the circuit board, the conductive adhesive layer and the protection layer, aligning the flowing region of the pressing structure with a portion of the conductive adhesive layer adjacent to the protection layer and a portion of protection layer adjacent to the conductive adhesive layer; (D2) applying a force from the pressing structure to the plate of the circuit board through the contact surface with the flowing region of the contact surface being space apart from the protection layer and the signal transmitting structure so as to form a flowing space, so that the conductive adhesive layer flows toward the protection layer through the flowing space to form the cover portion.

In some embodiments, in step (B), a distance between the conductive adhesive layer and the protection layer is not greater than 500 µm.

In some embodiments, in step (D), a spacing between an orthographic projection of the side edge at the flowing region and the edge of the protection layer adjacent to the conductive adhesive layer is not greater than 500 µm.

In some embodiments, in step (D), a distance between an orthographic projection of an inner edge of the flowing region which is away from the side edge and the edge of the protection layer adjacent to the conductive adhesive layer is not greater than 100 μm.

In some embodiments, in step (D), a distance between an edge of the plate adjacent to the protection layer and an edge of the protection layer ranges from 100 μm to 400 μm.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
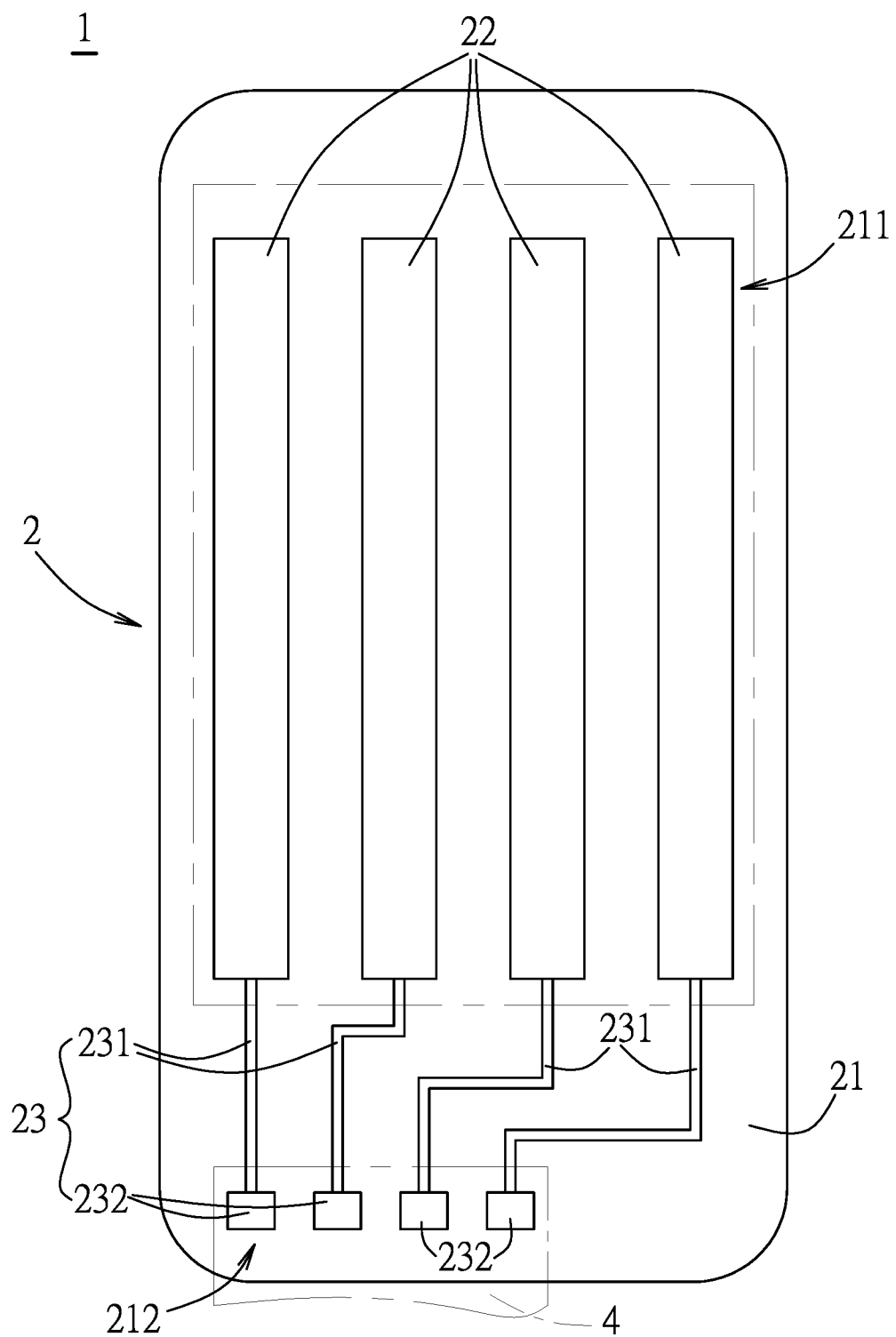
FIG. 1 is a schematic front view illustrating a touch module in accordance with at least one embodiment.

Like elements are denoted by the same reference numerals throughout the disclosure.

Figure 2:
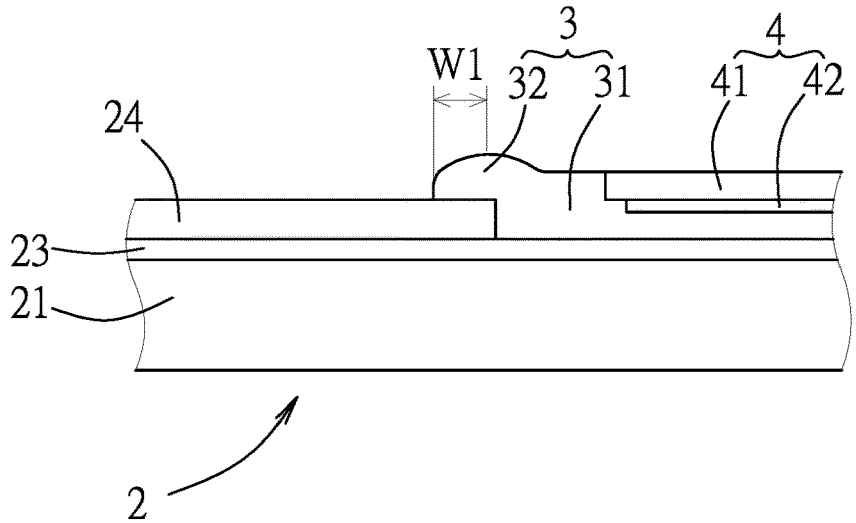
FIG. 2 is a schematic side view of the touch module.
Figure 3:
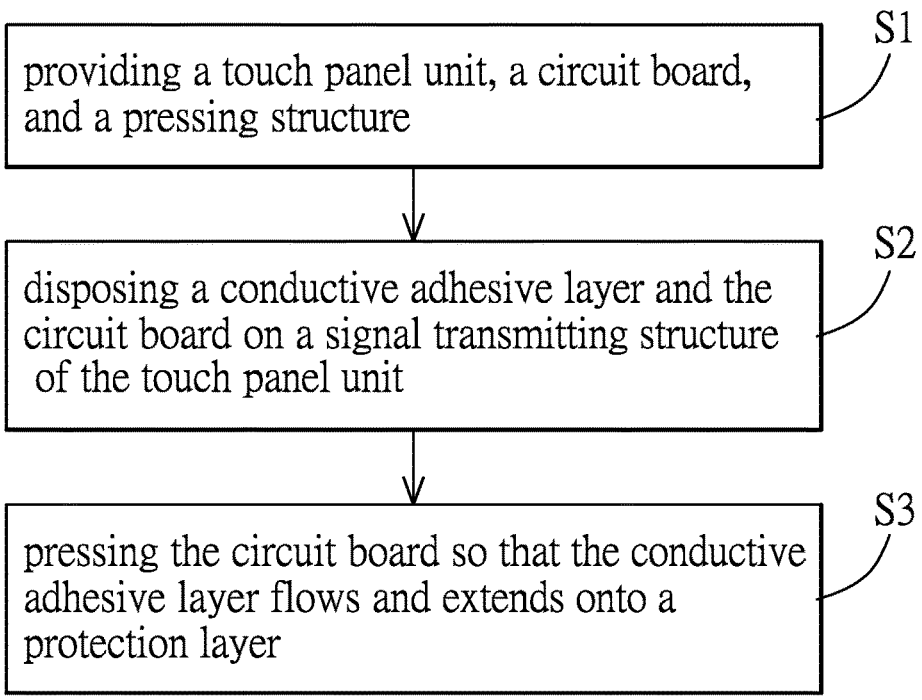
FIG. 3 is a flow chart illustrating a method for manufacturing a touch module in accordance with at least one embodiment.
Figure 4:
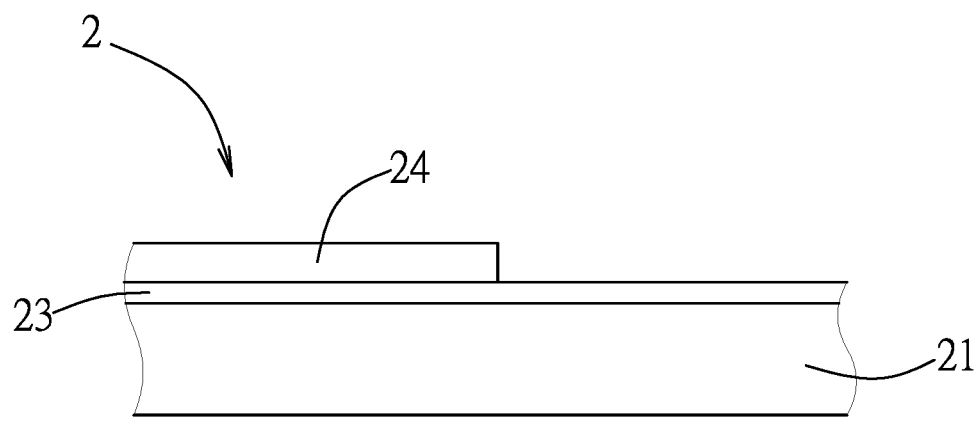
FIGS. 4 to 6 are schematic side views illustrating structure fabricating procedures of the method.

Referring to FIGS. 1, 2 and 4, a touch module 1 according to at least one embodiment is shown. The touch module 1 is adapted to be used integrally with various electronic devices, e.g., mobile phones, tablet PCs, and displays, and includes a touch panel unit 2, a conductive adhesive layer 3 and a circuit board 4.

The touch panel unit 2 is a structure of the touch module 1, and includes a substrate 21, a touch sensing structure 22, a signal transmitting structure 23 and a protection layer 24.

The substrate 21 has a sensing region 211 and a connecting region 212 spaced apart from the sensing region 211. The substrate 21 is a rigid or flexible substrate made of, e.g., glass, plastics, sapphire, polyethylene terephthalate (PET) film, polyimide (PI) film, or the like, to serve as a supporting structure for the touch sensing structure 22, the signal transmitting structure 23 and the protection layer 24.

The touch sensing structure 22 is disposed on the sensing region 211 of the substrate 21, and is made of a transparent conductive material, e.g., indium tin oxide (ITO), nano silver, nano tube, metal mesh, or the like. When the touch sensing structure 22 is touched by a user, a response signal generated according to a change in capacitance value is used as a basis for analyzing and controlling determination of the touching position. In addition, the touch sensing structure 22 may be made of a polymer material, a piezoresistive material, a piezoelectric material, etc., so that, after the touch sensing structure 22 is pressed by the user, the electrical property of the touch sensing structure 22 may change due to thickness change, structural deformation or direct piezoelectric effect. Different pressing and touching force applied by the user would generate a corresponding change in the electrical property, and thus, the pressing pressure may be measured according to the change in the electrical property. Accordingly, the touch sensing structure 22 may detect not only touch positions but also the touch force. In FIG. 1, the touch sensing structure 22 is exemplified by four strip structures which extend longitudinally. However, in practice, the touch sensing structure 22 may use an electrode structure that extends longitudinally, laterally or crisscross as a sensing structure. The specific structure and shape of the touch sensing structure 22 are not limited to this disclosure.

The signal transmitting structure 23 is disposed on the substrate 21 and electrically connected to the touch sensing structure 22. In some embodiments, the signal transmitting structure 23 includes a plurality of signal wires 231 respectively connected to the touch sensing structure 22 and a plurality of contacts 232 respectively connected to the signal wires 231 and disposed in the connecting region 212. The contacts 232 are electrically connected to the circuit board 4 to transmit the response signal generated by the touch sensing structure 22 to the circuit board 4, so that a control chip (not shown in the figures) can perform analysis and operation. Based on actual requirements, in material selection, the signal transmitting structure 23 is made of a metal material (e.g., copper, silver, gold, or the like) in some embodiments, or a transparent conductive material (e.g., indium tin oxide or the like) in some embodiments.

The protection layer 24 covers a part of a surface of the signal transmitting structure 23, and the protection layer 24 and the substrate 21 are located at two opposite sides of the signal transmitting structure 23 to serve as a passivation structure for protecting the electrical properties and appearance of the signal transmitting structure 23 from being affected by the environmental factors.

The conductive adhesive layer 3 has a main portion 31 that covers a region of the signal transmitting structure 23 on which the protection layer 24 is not disposed and a cover portion 32 that extends from the main portion 31 to the protection layer 24 and that covers the protection layer 24. The conductive adhesive layer 3 functions as an electrically conducting medium between the signal transmitting structure 23 and the circuit board 4, and also provides protection function to the signal transmitting structure 23 since it covers the surface of the signal transmitting structure 23. With formation of the cover portion 32, a part of the conductive adhesive layer 3 overlaps the protection layer 24, so that a structural error at a junction of the conductive adhesive layer 3 and the protection layer 24 does not result in a partial surface of the signal transmitting structure 23 not being covered by the conductive adhesive layer 3 and the protection layer 24. Such implementation ensures that the conductive adhesive layer 3 and the protection layer 24 will provide comprehensive protection to the signal transmitting structure 23. In some embodiments, the conductive adhesive layer 3 is made of an anisotropic conductive film (ACF) which provides the advantages of simplifying adhesion procedure and improving electrically conductive structure density. However, the material of the conductive adhesive layer 3 is not limited to the anisotropic conductive film. Moreover, in some embodiments, a width (W1) of the cover portion 32 covering the protection layer 24 ranges from 500 μm to 700 μm. Within this range, the covering protection effect provided by the conductive adhesive layer 3 can be ensured, and the manufacturing precision of the conductive adhesive layer 3 can be easily controlled during manufacturing procedures, thereby avoiding problems of glue starvation or glue overflow and facilitating improving manufacturing yield rate.

The circuit board 4 is disposed on the conductive adhesive layer 3, and the circuit board 4 and the signal transmitting structure 23 are disposed at two opposite sides of the conductive adhesive layer 3. The circuit board 4 includes a plate 41 and an electrically conductive structure 42 disposed on the plate 41 and electrically connected to the conductive adhesive layer 3 for transmitting the response signal from the signal transmitting structure 23 to the external control chip. In some embodiments, the circuit board 4 is a flexible printed circuit board (FPCB). The plate 41 is a soft substrate made from, e.g., a polyimide film (PI film). The electrically conductive structure 42 includes conductive wires of a metal material made by printing technology and golden fingers electrically connected to the contacts 232 through the conductive adhesive layer 3. However, based on actual requirements, the implementation of the circuit board 4 can be adjusted, and are not limited to the disclosure.

Referring to FIGS. 3 to 6, a method for manufacturing the touch module 1 is described.

Figure 5:
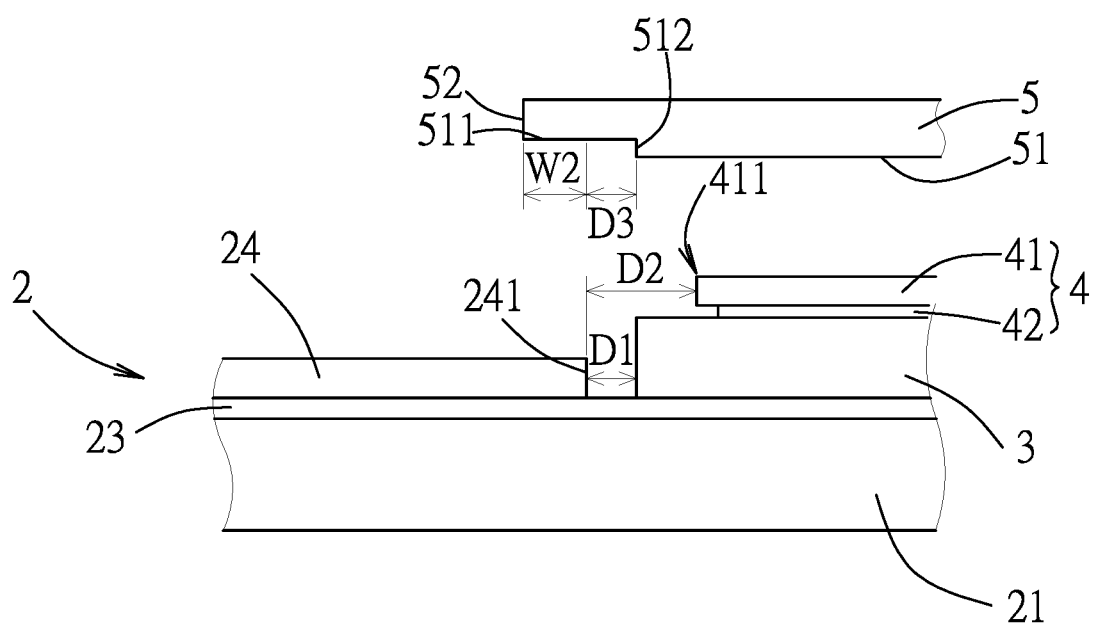

First, step S1 is to provide and prepare the touch panel unit 2, the circuit board 4 not yet assembled with the touch panel unit 2, and a pressing structure 5 (see FIG. 5, used in a pressing procedure). The specific structures of the touch panel unit 2 and the circuit board 4 are as described above. In some embodiments, the pressing structure 5 is a punch of a press machine, and has a contact surface 51 for abutting against the plate 41 of the circuit board 4, and a side edge 52 connected to the contact surface 51. The contact surface 51 of the pressing structure 5 is indented at a location corresponding to the side edge 52 to form a flowing region 511 so as to be presented in a shape like an inverted stepped structure.

Subsequently, step S2 is to dispose the conductive adhesive layer 3 and the circuit board 4 on the touch panel unit 2 shown in FIG. 4 so as to form a configuration as shown in FIG. 5. To be specific, in this step, the conductive adhesive layer 3 is first disposed on a region of the surface of the signal transmitting structure 23 on which the protection layer 24 is not disposed, and the conductive adhesive layer 3 is disposed adjacent to but spaced apart from the protection layer 24. In step S2, a distance (D1) between the conductive adhesive layer 3 and the protection layer 24 is preferably not greater than 500 μm. Within the distance range, the structure fabrication of the conductive adhesive layer 3 in the subsequent procedures can be effectively controlled, and the conductive adhesive layer 3 can be compatible with the pressing machine in terms of the specification, so as to facilitate proceeding of the manufacture. However, the distance (D1) may be adjusted based on actual requirements, and is not limited to the disclosure.

Furthermore, the circuit board 4 is disposed to be aligned with the conductive adhesive layer 3, with the electrically conductive structure 42 of the circuit board 4 facing the conductive adhesive layer 3 for performing the step of electrically connecting and adhering the circuit board 4 to the conductive adhesive layer 3. In some embodiments, the conductive adhesive layer 3 thus adapted is an anisotropic conductive adhesive, and thus, the circuit board 4 should be adjacent to but not overlap the protection layer 24. The electrically conductive structure 42 of the circuit board 4 should not overlap the protection layer 24. The reason for this is that, if the electrically conductive structure 42 overlaps the protection layer 24, due to the pressing of the circuit board 4 and the protection layer 24, conductive particles of the conductive adhesive layer 3 are liable to be unduly concentrated and aggregated in the subsequent procedure, i.e. after the conductive adhesive layer 3 flows to the protection layer 24 and contacts the electrically conductive structure 42. Thus, electrical conduction in a horizontal direction is easily generated, which causes abnormal signal transmission. Therefore, in some embodiments, the circuit board 4 is arranged to not overlap the protection layer 24, and a distance (D2) between an edge 411 of the plate 41 adjacent to the protection layer 24 and an edge 241 of the protection layer 24 preferably ranges from 100 μm to 400 μm, thereby effectively avoiding abnormal signal transmission. However, when another conductive material other than the anisotropic conductive adhesive is used for the conductive adhesive layer 3, the arrangement of the circuit board 4 is not limited to the aforesaid implementation.

Figure 6:
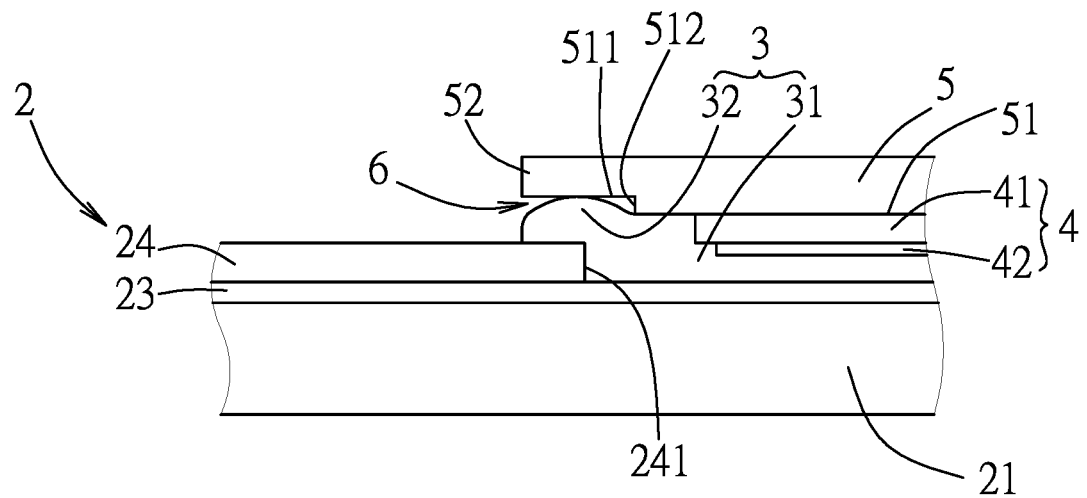

After the aforesaid steps are accomplished, step S3 is conducted to press the circuit board 4 using the pressing structure 5, so that the conductive adhesive layer 3 flows and extends onto the protection layer 24, and thus, the conductive adhesive layer 3 having the configuration of FIG. 5 is transformed into the configuration shown in FIG. 6 which is formed with the main portion 31 and the cover portion 32. To be specific, as shown in FIG. 5, step S3 is performed to first align the pressing structure 5 with the circuit board 4, the conductive adhesive layer 3 and the protection layer 24, and align the flowing region 511 of the pressing structure 5 with a portion of the conductive adhesive layer 3 which is adjacent to the protection layer 24 and a portion of the protection layer 24 which is adjacent to the conductive adhesive layer 3. A spacing (W2) between an orthographic projection of the side edge 52 at the flowing region 511 and the edge 241 of the protection layer 24 which is adjacent to the conductive adhesive layer 3 is preferably not greater than 500 μm, and a spacing (D3) between an orthographic projection of an inner edge 512 which is away from the side edge 52 of the flowing region 511 and the edge 241 which is adjacent to the conductive adhesive layer 3 of the protection layer 24 is preferably not greater than 100 μm. Such configuration and alignment are helpful for processing control of the conductive adhesive layer 3. After the alignment operation is completed, the circuit board 4 is pressed toward the touch panel unit 2 and the conductive adhesive layer 3, so that, as shown in FIG. 6, the pressing structure 5 applies a pressing force onto the plate 41 of the circuit board 4 through the contact surface 51, and the flowing region 511 of the contact surface 51 is spaced apart from the protection layer 24 and the signal transmitting structure 23 so as to form a flowing space 6. The pressing of the pressing structure 5 to the circuit board 4 would make the conductive adhesive layer 3 flow toward the protection layer 24 through the flowing space 6 so as to form the cover portion 32 which covers the protection layer 24. Therefore, by virtue of the pressing of the pressing structure 5 and the arrangement of the flowing region 511 and the flowing space 6, the flowing of the conductive adhesive layer 3 and the covering of the conductive adhesive layer 3 on the protection layer 24 can be effectively controlled, so that the problem of starvation or overflow of the conductive adhesive layer 3 would not occur. The cooperation between the conductive adhesive layer 3 and the protection layer 24 could provide perfect structure protection to the signal transmitting structure 23, thereby avoiding occurrence of abnormal electrical property and appearance of the signal transmitting structure 23 and improving manufacturing yield rate. In addition, the aforesaid manufacture may effectively control the processing condition of the conductive adhesive layer 3 to avoid the occurrence of abnormal starvation of the conductive adhesive layer 3. Therefore, after the conductive adhesive layer 3 is manufactured, an additional dispensing procedure is not required to be performed for avoiding gel starvation. Thus, the manufacture can be simplified and the apparatus and materials used in the dispensing process can be saved, thereby greatly reducing manufacturing costs and saving the manufacturing time.

Figure 7:
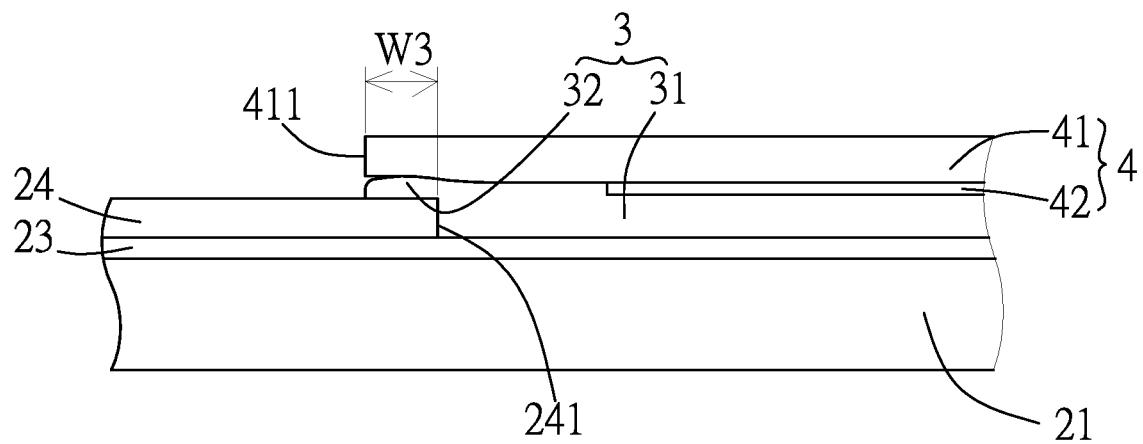
FIG. 7 is a side view illustrating a touch module in accordance with at least one embodiment.

FIG. 7 shows the touch module 1 in accordance with at least one other embodiment. Many structures shown in FIG. 7 are the same as those shown in FIG. 2, and the major differences reside in that, in the touch module 1 shown in FIG. 7, although the electrically conductive structure 42 of the circuit board 4 does not overlap the protection layer 24, the edge 411 of the plate 41 overlaps the protection layer 24 and the cover portion 32 of the conductive adhesive layer 3, and the edge 411 and the protection layer 24 are disposed at two opposite sides of the cover portion 32, so as to form a structure in which the protection layer 24, the conductive adhesive layer 3 and the edge 411 of the plate 41 are sequentially stacked from bottom to top. In some embodiments, an overlapping width (W3) between the edge 411 of the plate 41 and the protection layer 24 preferably ranges from 50 μm to 700 μm, which is used for the processing control of the conductive adhesive layer 3.

Figure 8:
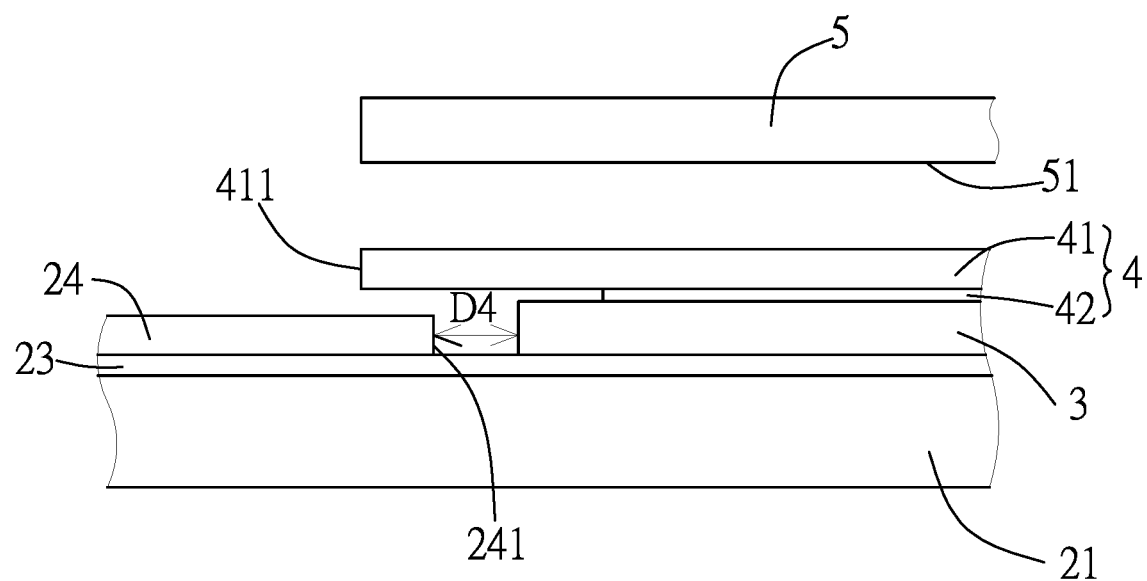
FIG. 8 is a side view illustrating another method for manufacturing a touch module.

FIG. 8 is a drawing similar to FIGS. 5 and 6, and is used for illustrating the manufacturing procedures for the touch module 1 shown in FIG. 7. According to the implementation of the circuit board 4 shown in FIG. 7, when the circuit board 4 is arranged, the edge 411 of the plate 41 overlaps the protection layer 24 with the edge 411 of the plate 41 being perpendicularly spaced apart from the protection layer 24, and thus, a space is formed between the plate 41 and the protection layer 24. Then, when the pressing structure 5 applies a force to the circuit board 4, the conductive adhesive layer 3 (which is originally spaced apart from the protection layer 24 by a distance (D4) preferably not greater than 500 μm) flows toward the protection layer 24, and flows onto the protection layer 24 through the space between the circuit board 4 and the protection layer 24, so that the conductive adhesive layer 3 is formed into the cover portion 32 which covers the protection layer 24. As such, through the implementation of the edge 411 of the plate 41, the processing process of the conductive adhesive layer 3 can be effectively controlled so as to avoid the occurrence of abnormal gel overflow and gel starvation, thereby improving manufacturing yield rate, simplifying manufacturing steps and reducing manufacturing costs.

The conductive adhesive layer 3 of the touch module 1 not only functions as an electrically conductive medium between the signal transmitting structure 23 and the circuit board 4, but also cooperates with the protection layer 24 to cover the surface of the signal transmitting structure 23 so as to provide good protection to the signal transmitting structure 23. By forming the conductive adhesive layer 3 with the cover portion 32 that extends to cover the protection layer 24, the dispensing process can be eliminated, and it is ensured that the signal transmitting structure 23 can be completely covered and protected, thereby improving manufacturing yield rate and reducing costs.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A touch module, comprising:
a touch panel unit including a substrate, a touch sensing structure disposed on the substrate, a signal transmitting structure disposed on the substrate and electrically connected to the touch sensing structure, and a protection layer covering a part of a surface of the signal transmitting structure, the protection layer and the substrate being disposed at two opposite sides of the signal transmitting structure;
a conductive adhesive layer having a main portion that covers a region of the signal transmitting structure on which the protection layer is not disposed, and a cover portion that extends from the main portion to cover the protection layer; and
a circuit board disposed on the conductive adhesive layer, the circuit board and the signal transmitting structure being disposed at two opposite sides of the conductive adhesive layer, the circuit board including a plate and an electrically conductive structure disposed on the plate and electrically connected to the conductive adhesive layer, an edge of the plate overlapping the cover portion of the conductive adhesive layer, wherein an overlapping width between the edge of the plate and the protection layer ranges from 50 μm to 700 μm.

2. The touch module of claim 1, wherein the electrically conductive structure of the circuit board and the protection layer do not overlap, the edge and the protection layer being disposed at two opposite sides of the cover portion.

3. The touch module of claim 1, wherein a width of the cover portion of the conductive adhesive layer covering the protection layer ranges from 500 μm to 700 μm.

4. A method for manufacturing a touch module, comprising the steps of:
(A) providing a touch panel unit and a circuit board, the touch panel unit including a substrate, a touch sensing structure disposed on the substrate, a signal transmitting structure disposed on the substrate and electrically connected to the touch sensing structure, and a protection layer covering a part of a surface of the signal transmitting structure, the circuit board including a plate and an electrically conductive structure formed on the plate;
(B) disposing a conductive adhesive layer on a surface of the signal transmitting structure on which the protection layer is not disposed, and spacing the conductive adhesive layer apart from the protection layer, wherein a distance between the conductive adhesive layer and the protection layer is not greater than 500 μm;
(C) aligning the circuit board with the conductive adhesive layer with the electrically conductive structure of the circuit board facing the conductive adhesive layer; and
(D) pressing the circuit board toward the touch panel unit and the conductive adhesive layer so as to electrically connect the electrically conductive structure of the circuit board to the conductive adhesive layer, whereby the pressing of the circuit board makes the conductive adhesive layer flow toward the protection layer so that the conductive adhesive layer is formed into a main portion that covers a portion of the signal transmitting structure on which the protection layer is not disposed, and a cover portion that extends from the main portion to the protection layer and covers the protection layer.

5. The method for manufacturing a touch module of claim 4, wherein, in step (A), a pressing structure is further provided, the pressing structure having a contact surface abutting against the plate and a side edge connecting the contact surface, the contact surface of the pressing structure being indented at a location corresponding to the side edge to form a flowing region; in step (C), the circuit board is adjacent to the protection layer but not overlapping the protection layer; and step (D) includes the following steps: (D1) aligning the pressing structure with the circuit board, the conductive adhesive layer and the protection layer, aligning the flowing region of the pressing structure with a portion of the conductive adhesive layer adjacent to the protection layer and a portion of protection layer adjacent to the conductive adhesive layer; (D2) applying a force from the pressing structure to the plate of the circuit board through the contact surface with the flowing region of the contact surface being spaced apart from the protection layer and the signal transmitting structure so as to form a flowing space, so that the conductive adhesive layer flows toward the protection layer through the flowing space to form the cover portion.

6. The method for manufacturing a touch module of claim 5, wherein, in step (D), a spacing between an orthographic projection of the side edge at the flowing region and the edge of the protection layer adjacent to the conductive adhesive layer is not greater than 500 μm.

7. The method for manufacturing a touch module of claim 5, wherein, in step (D), a distance between an orthographic projection of an inner edge of the flowing region which is distal from the side edge and the edge of the protection layer adjacent to the conductive adhesive layer is not greater than 100 μm.

8. The method for manufacturing a touch module of claim 4, wherein, in step (D), a distance between an edge of the plate adjacent to the protection layer and an edge of the protection layer ranges from 100 μm to 400 μm.

9. A touch module, comprising:
a touch panel unit including a substrate, a touch sensing structure disposed on the substrate, a signal transmitting structure disposed on the substrate and electrically connected to the touch sensing structure, and a protection layer covering a part of a surface of the signal transmitting structure, the protection layer and the substrate being disposed at two opposite sides of the signal transmitting structure;
a conductive adhesive layer having a main portion that covers a region of the signal transmitting structure on which the protection layer is not disposed, and a cover portion that extends from the main portion to cover the protection layer; and
a circuit board disposed on the conductive adhesive layer, the circuit board and the signal transmitting structure being disposed at two opposite sides of the conductive adhesive layer, the circuit board including a plate and an electrically conductive structure disposed on the plate and electrically connected to the conductive adhesive layer, wherein the circuit board and the protection layer do not overlap, wherein a distance between an edge of the plate which is adjacent to the protection layer and an edge of the protection layer ranges from 100 μm to 400 μm.

10. The touch module of claim 9, wherein a width of the cover portion of the conductive adhesive layer covering the protection layer ranges from 500 μm to 700 μm.

* * * * *